(12) United States Patent
Poon

(10) Patent No.: US 7,851,937 B2
(45) Date of Patent: Dec. 14, 2010

(54) WIND-POWERED GENERATOR AND ASSEMBLIES THEREWITH

(75) Inventor: Wo Huen Poon, Kowloon (HK)

(73) Assignee: AWA Micro Power Corporation Limited, Kowloon (HK)

( * ) Notice: Subject to any disclaimer, the term of this patent is extended or adjusted under 35 U.S.C. 154(b) by 0 days.

(21) Appl. No.: 11/809,181

(22) Filed: May 31, 2007

(65) Prior Publication Data

US 2008/0296902 A1 Dec. 4, 2008

(51) Int. Cl.
*F03D 9/00* (2006.01)
(52) U.S. Cl. ........................................................ 290/55
(58) Field of Classification Search ................... 290/55
See application file for complete search history.

(56) References Cited

U.S. PATENT DOCUMENTS

| | | | | |
|---|---|---|---|---|
| 983,742 | A * | 2/1911 | Mead | 362/192 |
| 1,131,063 | A * | 3/1915 | Klemmer | 310/75 B |
| 1,487,502 | A * | 3/1924 | Wood | 362/192 |
| 2,105,719 | A * | 1/1938 | Collins | 310/75 A |
| 2,424,700 | A * | 7/1947 | McMath | 362/192 |
| 2,525,817 | A * | 10/1950 | MacAdams | 310/69 |
| 3,961,577 | A * | 6/1976 | O'Steen | 102/208 |
| 4,890,528 | A * | 1/1990 | Kamijima | 84/95.2 |
| 5,796,240 | A * | 8/1998 | Saito et al. | 322/10 |
| 5,880,532 | A * | 3/1999 | Stopher | 290/1 E |
| 5,982,577 | A * | 11/1999 | Brown et al. | 360/96.3 |
| 6,288,463 | B1 * | 9/2001 | Tada et al. | 310/75 B |
| 6,433,450 | B1 * | 8/2002 | Chao | 310/113 |
| 6,763,915 | B2 * | 7/2004 | Nagao et al. | 185/37 |
| 6,914,340 | B2 * | 7/2005 | Becker et al. | 290/1 R |
| 6,924,571 | B2 * | 8/2005 | Bye | 310/75 A |
| 7,009,350 | B1 * | 3/2006 | Gold | 318/142 |
| 7,109,594 | B2 * | 9/2006 | Liao | 290/1 C |
| 7,127,886 | B2 * | 10/2006 | Fielder | 60/398 |
| 7,276,805 | B2 * | 10/2007 | Poon | 290/1 E |
| 2005/0194852 | A1 * | 9/2005 | Liao | 310/99 |
| 2006/0197477 | A1 * | 9/2006 | Poon | 318/111 |
| 2007/0152448 | A1 * | 7/2007 | Goldman et al. | 290/1 R |

FOREIGN PATENT DOCUMENTS

| | | | | |
|---|---|---|---|---|
| EP | 1691128 | A2 * | 8/2006 | |
| JP | 56081270 | A * | 7/1981 | |
| JP | 56081271 | A * | 7/1981 | |
| JP | 56101079 | A * | 8/1981 | |
| JP | 2001115945 | A * | 4/2001 | |
| JP | 2008298079 | A * | 12/2008 | |
| SU | 1574899 | A * | 6/1990 | |

* cited by examiner

*Primary Examiner*—Joseph Waks
(74) *Attorney, Agent, or Firm*—Leydig, Voit & Mayer, Ltd.

(57) ABSTRACT

A wind-powered electrical assembly includes an electrical device electrically connected to an electrical generator. The electrical generator is operable to provide an electric current to the electrical device to operate the electrical device. The electrical generator has a rotor. The electrical assembly further includes a wind-powered actuator assembly configured to rotate when subject to an operating wind and a gear train arranged with the electrical generator for operating the electrical generator. The gear train can include a plurality of gears wherein a first gear can be operably arranged with a spring assembly. A second gear of the drive train can be operably arranged with the wind-powered actuator assembly and a third gear can be mounted to the rotor of the electrical generator.

8 Claims, 19 Drawing Sheets

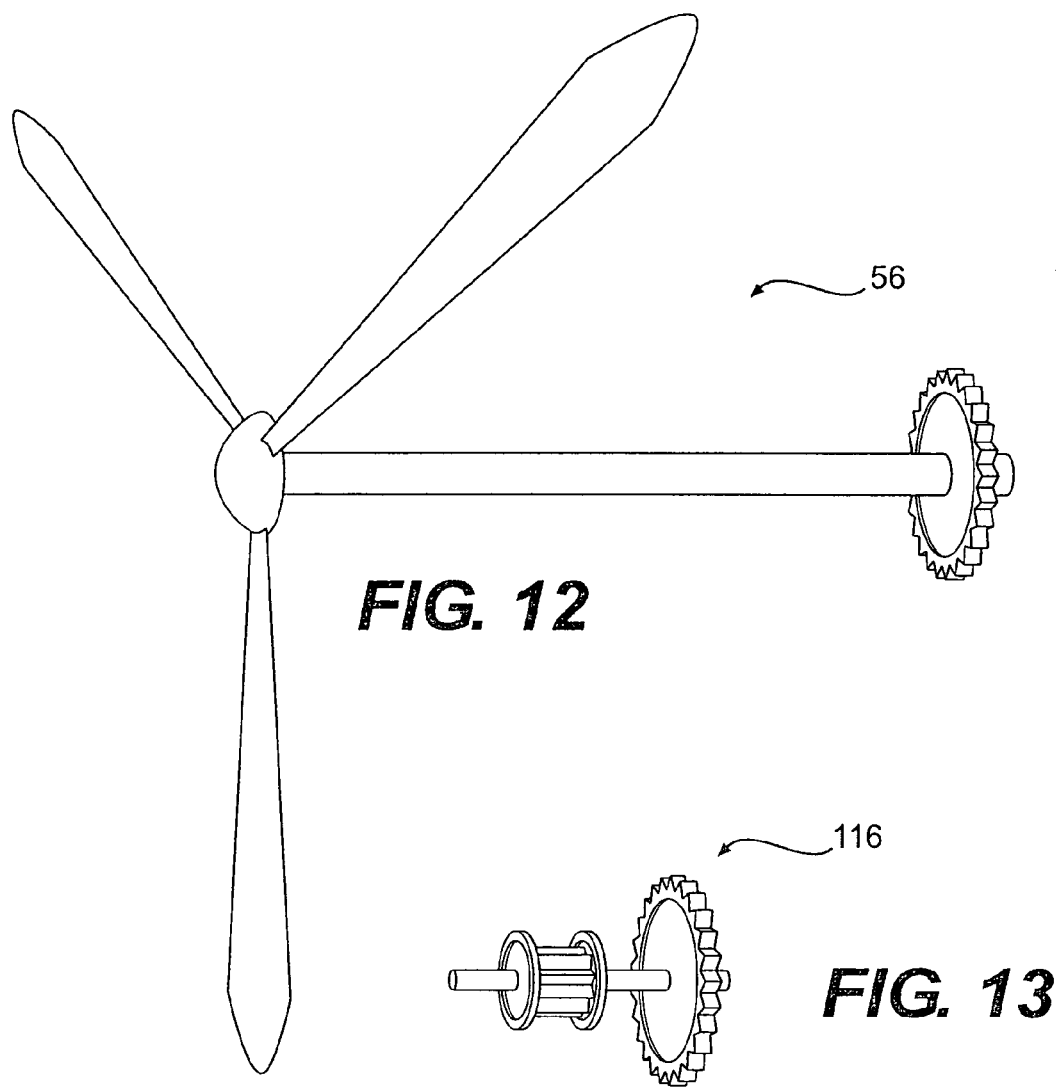
FIG. 12
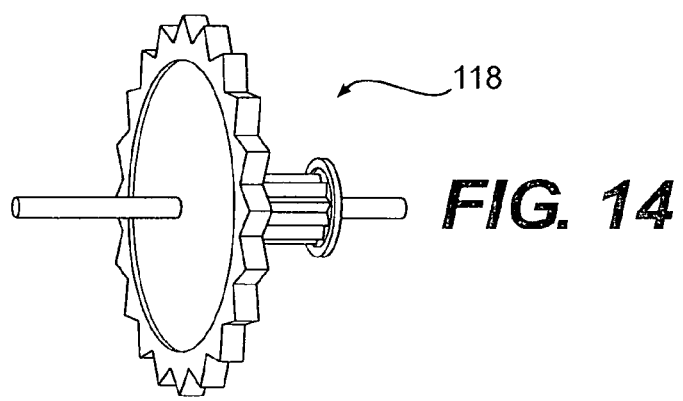
FIG. 13
FIG. 14

US 7,851,937 B2

WIND-POWERED GENERATOR AND ASSEMBLIES THEREWITH

FIELD OF THE INVENTION

This invention pertains to wind-powered generators, and more particularly to wind-powered generators for powering relatively small electronic devices.

BACKGROUND OF THE INVENTION

In areas not connected to a power grid or in the event of an electrical power outage, for example, an alternative source for electricity is often desirable, particularly for providing illumination. Often in such a situation, batteries for flashlights are not on hand or no longer provide a charge. Generators can be relatively large and inconvenient for use with small devices.

BRIEF SUMMARY OF THE INVENTION

The invention provides a wind-powered generator assembly for powering relatively small electronic devices. In one embodiment of the present invention there is provided a wind-powered electrical assembly comprising an electrical device and an electrical generator. The electrical generator can be electrically connected to the electrical device. The electrical generator is operable to provide an electric current to the electrical device to operate the electrical device. The electrical generator has a rotor. The electrical assembly further comprises a wind-powered actuator assembly configured to rotate when subject to an operating wind and a gear train arranged with the electrical generator for operating the electrical generator. The gear train can include a plurality of gears wherein a first gear can be operably arranged with a spring assembly. The spring assembly can have a reel mounted to the shaft of the first gear and a tape spring for rotationally biasing the reel to rotate in a return direction. The tape spring can be wound on the reel and connected such that when the shaft is moved in an operating direction, the reel rotates in a forward direction and the tape spring develops a return force. The return force can urge the reel and the shaft of the first gear to move in a return direction. The return direction can oppose the forward direction. A second gear of the drive train can be operably arranged with the wind-powered actuator assembly and a third gear can be mounted to the rotor of the electrical generator.

In another embodiment, the invention is in the form of a light assembly. The light assembly comprises a light source, an electrical generator, and a wind actuator assembly. The electrical generator is electrically connected to the light source and is operable to provide an electric current to the light source to operate the light source for providing light. The electrical generator has a rotor. The wind actuator assembly is arranged with the electrical generator for operating the electrical generator by wind power. The wind actuator assembly includes at least one blade attached to a rotatable shaft, and a drive train connected to the shaft and the electrical generator for rotating the rotor of the electrical generator. The drive train includes a plurality of gears, one gear of the drive train being mounted to the shaft of wind actuator assembly and another gear being mounted to the rotor of the electrical generator. In one embodiment, the wind powered generator includes an aerodynamic housing, wherein the wind actuator assembly protrudes from the shell. In other embodiments, the invention is useful for powering other electrical devices, such as a mobile phone or a fan, for example.

The features of the present invention will become apparent to one of ordinary skill in the art upon reading the detailed description, in conjunction with the accompanying drawings, provided herein.

BRIEF DESCRIPTION OF THE DRAWINGS

FIG. 12 is a perspective view of the wind actuator assembly of the wind-powered generator of FIG. 1.

FIG. 13 is a perspective view of the first transfer gear of the wind-powered generator of FIG. 1.

FIG. 14 is a perspective view of the second transfer gear of the wind-powered generator of FIG. 1.

DETAILED DESCRIPTION OF THE INVENTION

Figure 1:
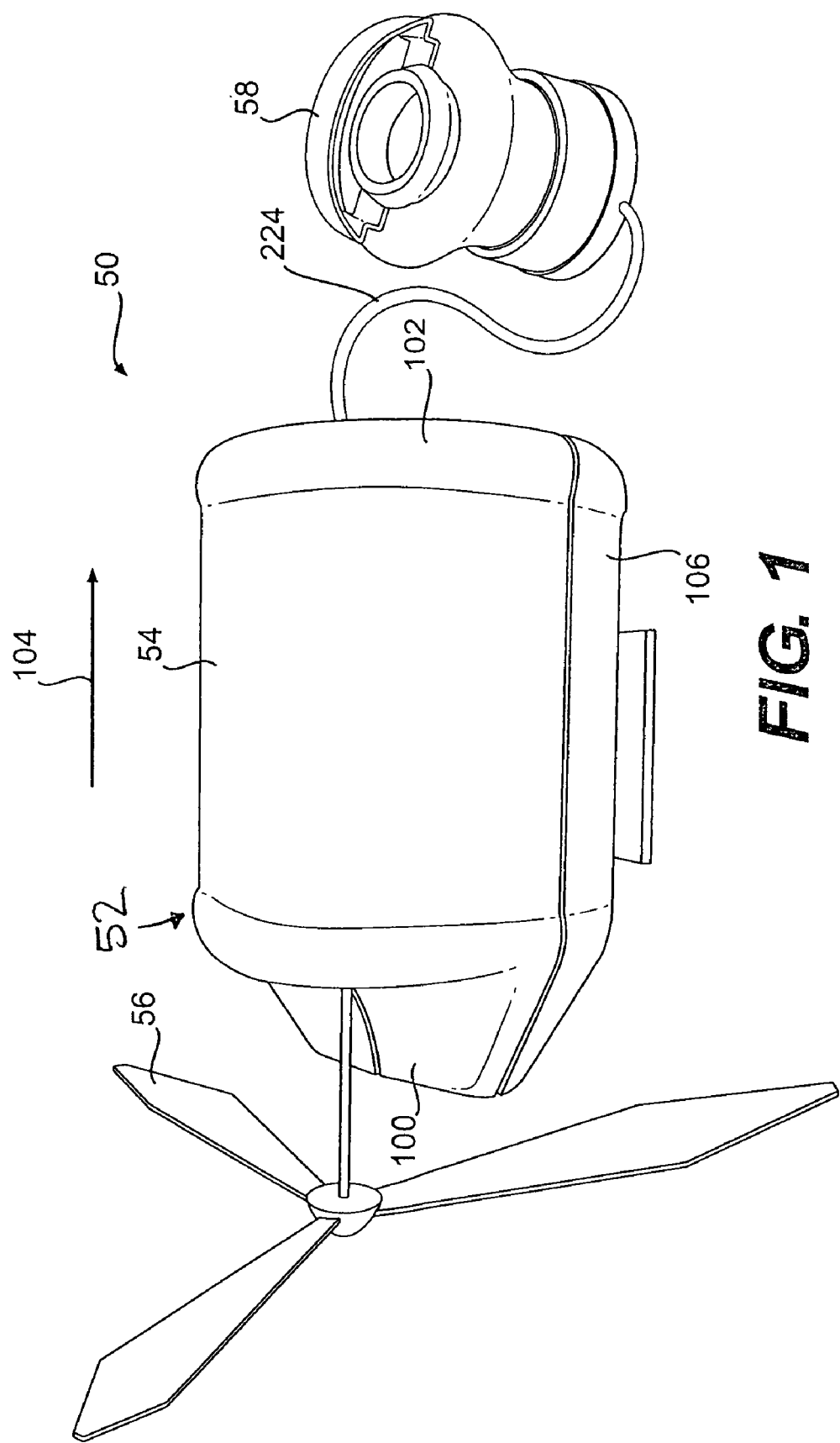
FIG. 1 is a perspective side view of a light assembly in accordance with the teachings of the present invention, the light assembly comprising a wind-powered generator and a light source.
Figure 4:
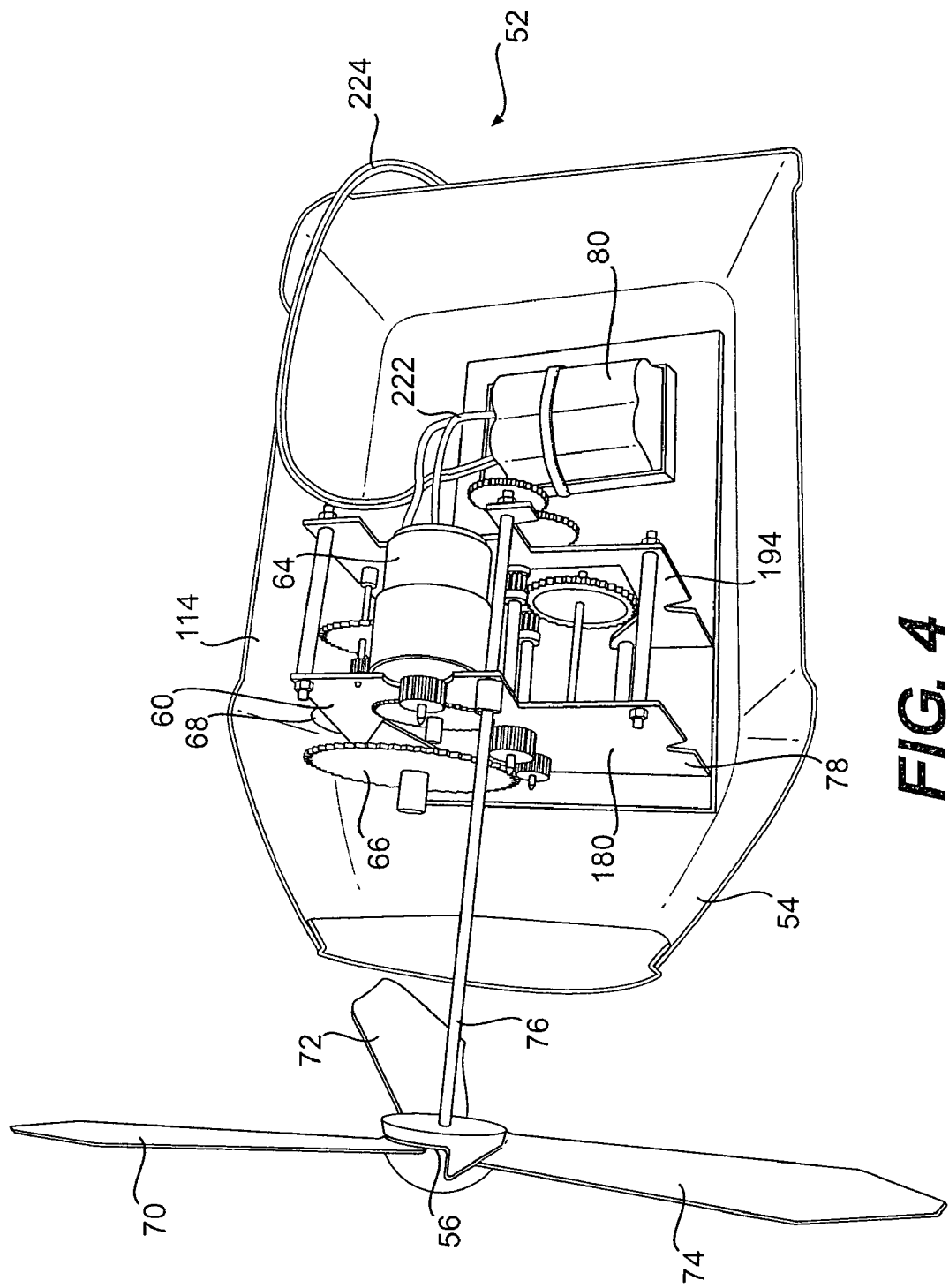
FIG. 4 is another perspective view of the wind-powered generator of FIG. 1 with the top half of the housing thereof removed for illustrative purposes.
Figure 5:
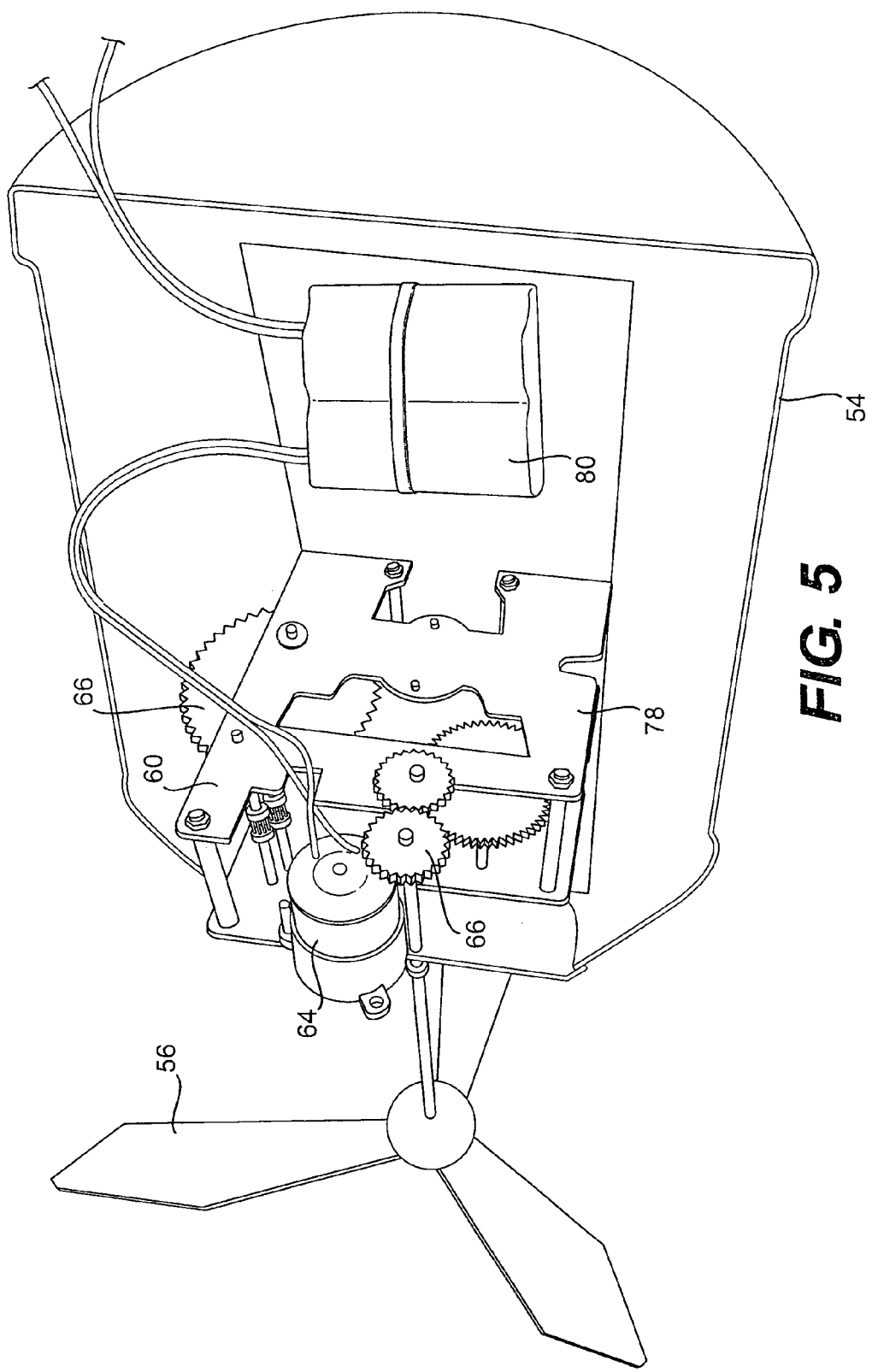
FIG. 5 is another perspective view of the wind-powered generator of FIG. 1 with the top half of the housing thereof removed for illustrative purposes.

Turning now to the drawings, there is shown in FIG. 1, a light assembly 50 according to the present invention including a wind-powered generator assembly 52 including an electrical generator device 60 (FIG. 4) contained within a housing 54, a wind actuator assembly 56, and a light source 58. Referring to FIG. 4, the housing 54 may be opened to expose the generator device 60. As shown, the wind-powered generator assembly 52 comprises a generator 64, a gear train 66, a spring housing 68, the wind actuator assembly 56 including a plurality of blades 70, 72, 74 and a shaft 76, a frame 78, and a rechargeable battery 80.

Figure 6:
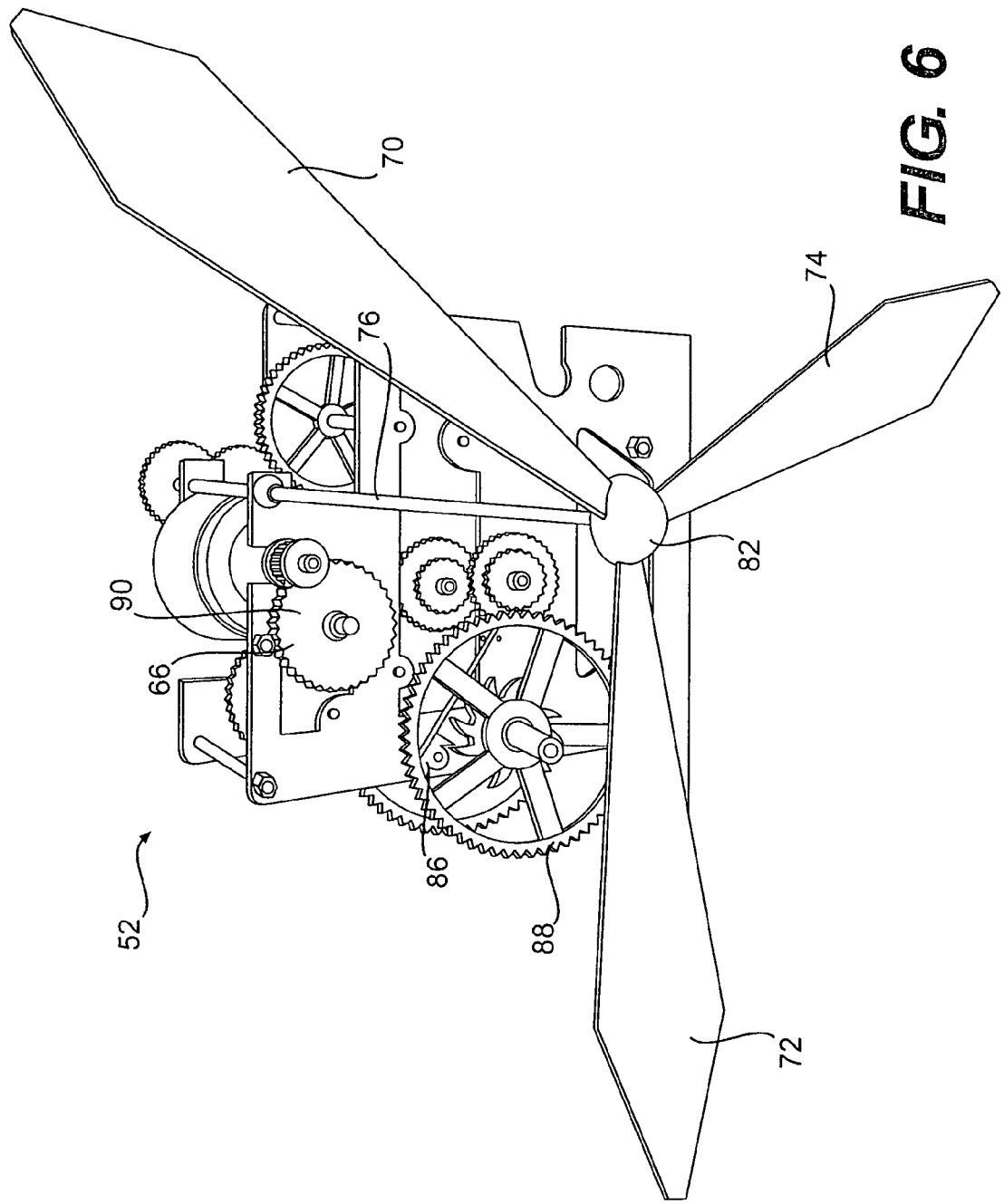
FIG. 6 is a front perspective view of the wind-powered generator of FIG. 1 with the housing removed.

Referring to FIG. 6, the blades 70, 72, 74 of the wind actuator assembly 56 are coupled to the shaft 76 via a rotor 82 to power rotation of the shaft 76 in an operating direction. The shaft 76 is operatively coupled to the gear train 66. The spring pawl 86 mechanism is embedded within the gear train 66, thereby dividing the gear train 66 into an actuator section 88 and a generator section 90.

Figure 7:
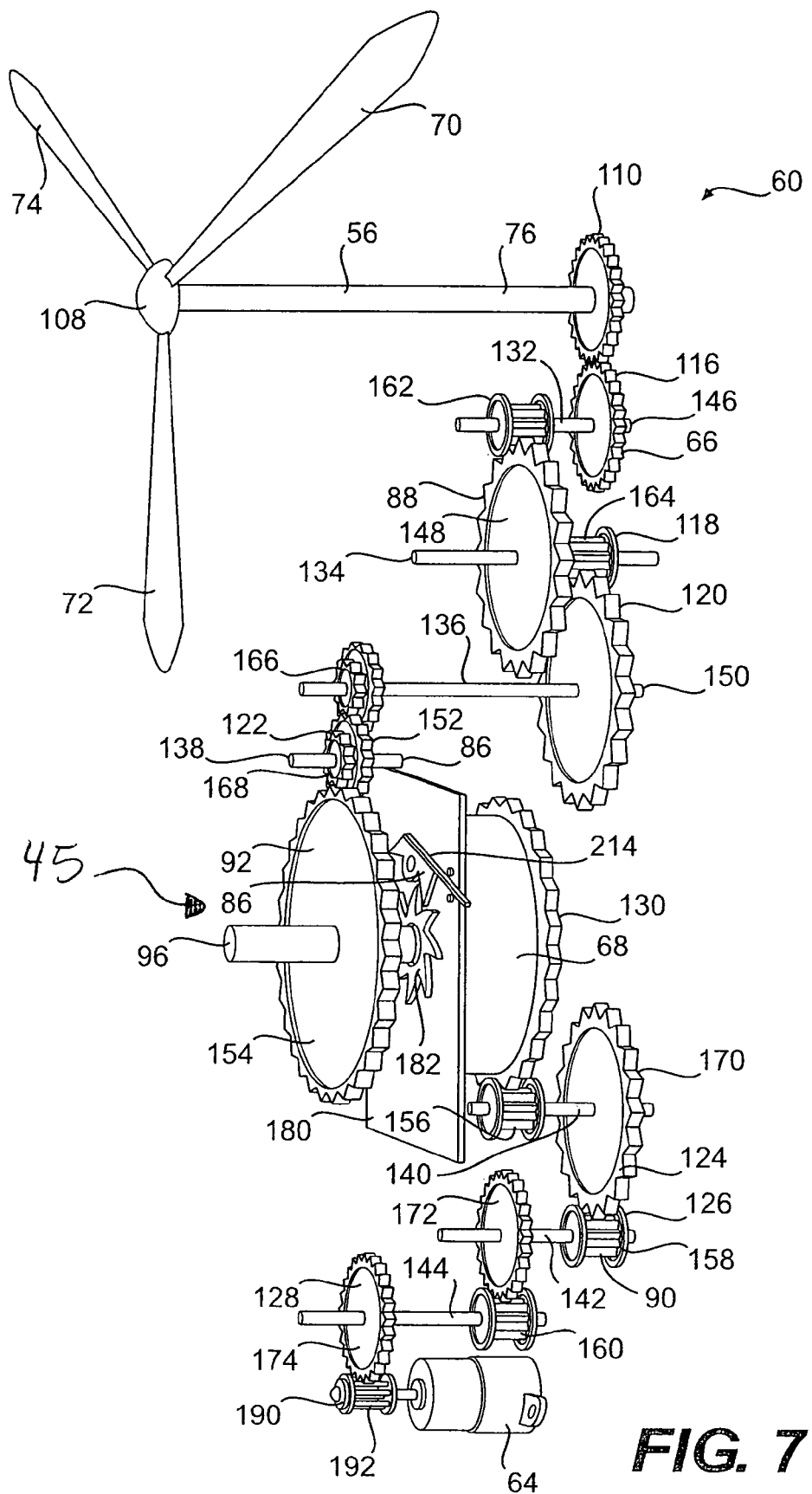
FIG. 7 is a perspective view of the operable arrangement of the wind actuator assembly, the gear train, and the electrical generator the wind-powered generator of FIG. 1.

Referring to FIG. 7, the spring pawl mechanism 86 is operably arranged with the shaft 96 of the fifth transfer gear 92, which is part of the actuator side 88 of the gear train 66. The spring pawl mechanism 86 is operably connected to the shaft 76 of the wind actuator assembly 76 via the actuator section 88 of the gear train 66 in order to prevent the shaft 76 from rotating in a direction opposite the operating direction. The spring housing 68 is connected to the shaft 96 of the fifth transfer gear 92 such that a tape spring 210 (FIG. 18) within the spring housing 68 is wound upon rotational movement of the shaft 96 in the operating direction. The spring housing 68 is also operably arranged with the generator section 90 of the gear train 66 for providing rotational movement of the generator section 90 when the tape spring is unwound. The generator section 90 of the gear train 66 in turn, is operably arranged with the generator 64 such that the rotational movement of the gear train 66 is converted to electricity by the generator 64.

Referring to FIG. 4, the generator 64 is electrically connected to the rechargeable battery 80 by a cable 222. The rechargeable battery 80 is electrically connected to the light source by cable 224 to provide electricity thereto. The frame 78 is used to mount and support components of the electrical generator device 60.

Referring to FIG. 1, the housing 54 is provided to contain and protect components of the electrical generator device. The housing 54 embodies an aerodynamic design without any sharp edges that is configured to present a relatively unobstructed flow path for an operating wind. An operating wind can include air flowing through the wind actuator assembly 56 over the housing 54 from the front end 100 to the rear end 102 of the housing 54 in a direction 104. The wind actuator assembly 56 projects from the front end 100 of the housing 54 in order to receive the operating wind. The housing 54 can have a generally cylindrical body 106 wherein the rear end 102 is generally flat and circular.

Figure 2:
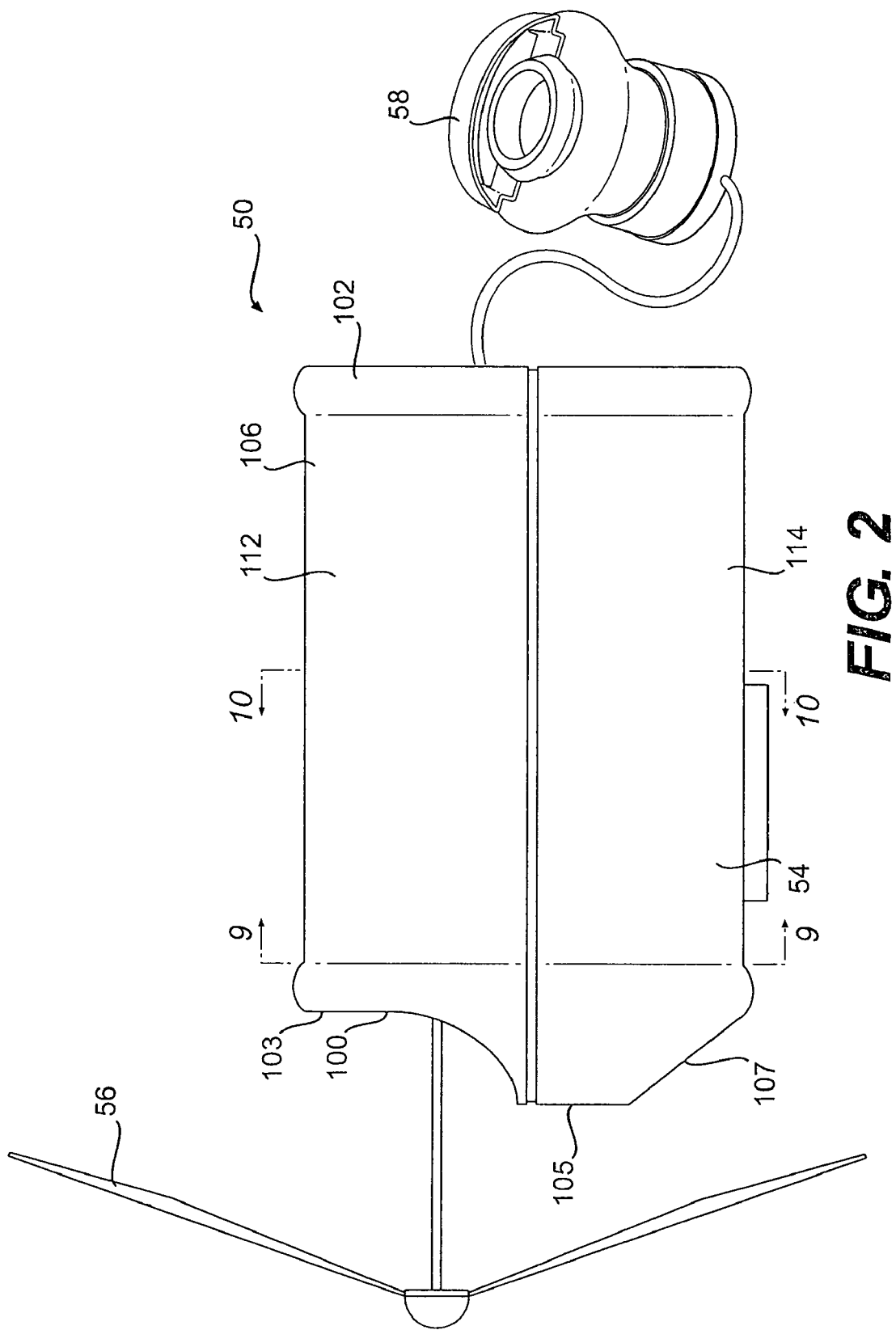
FIG. 2 is side elevational view of the wind-powered generator and a perspective view of the light source of the light assembly of FIG. 1.
Figure 3:
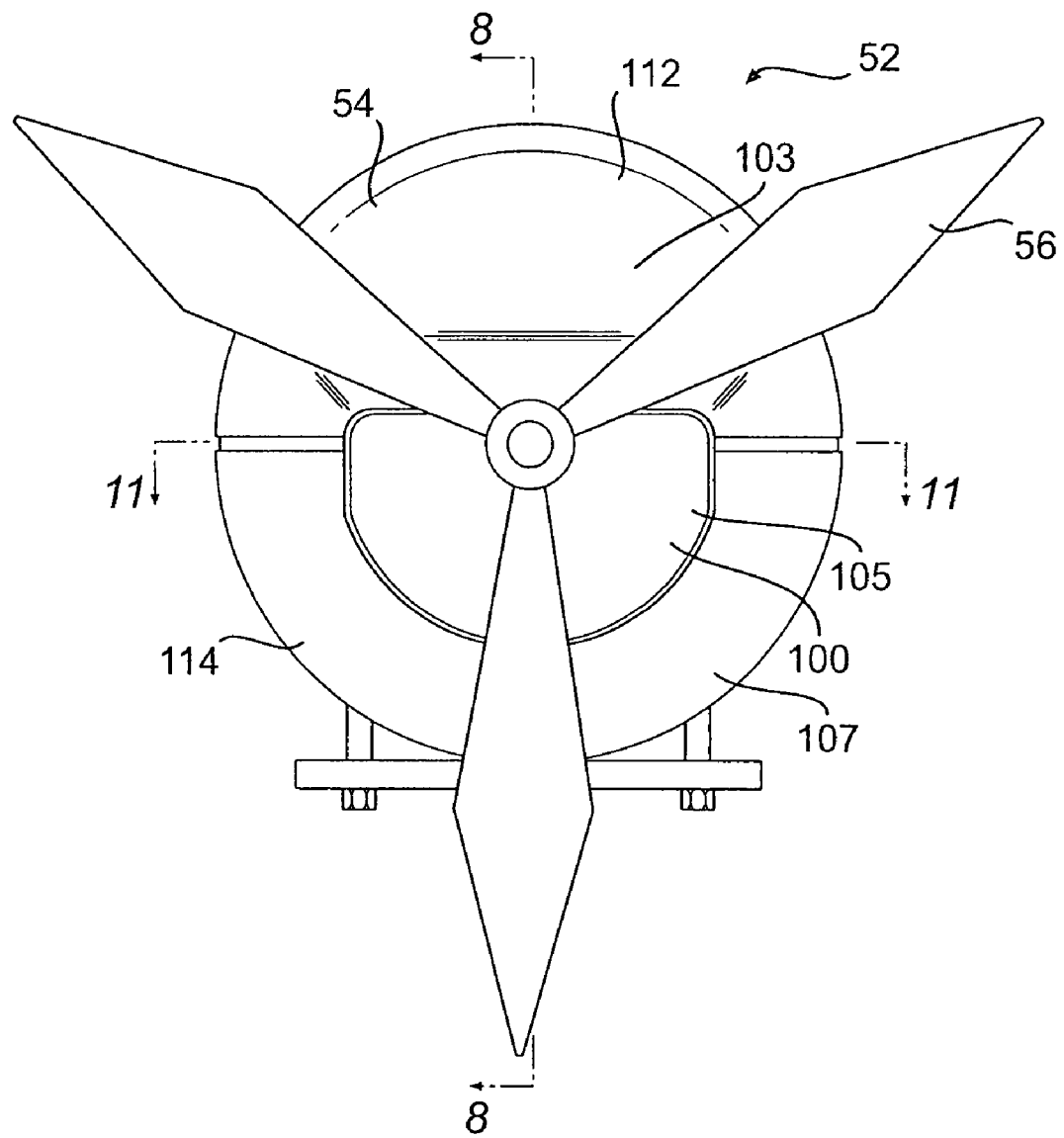
FIG. 3 is a front elevational view of the wind-powered generator of FIG. 1.

Referring to FIG. 2, the front end 100 of the housing may include an upper section 103, a middle section 105, and a lower section 107. The front end 100 may generally taper to the middle section 105, which represents the forwardmost part of the housing 54. The upper section 103 may initially descend vertically from the body 106 and then extend down and forward to the middle section 105 along a concave curve. The lower section 105 may extend up to middle section 105 along a generally conical path. The wind actuator assembly 56 extends forward from the upper section 103 such that the rotor is located generally in front of the upper section 103. The housing may include an upper half 114 and a lower 112 that are separable.

Referring to FIG. 4, the top half may be removed from the bottom half 112 to expose the generator device 60. The bottom half 114 may cradle the generator device 60 and the battery 80.

In other embodiments, the wind-powered generator assembly can have other types of housings. In other embodiments the housing can include legs or can be mounted on top of a tower or building in order to better harness an operating wind. In other embodiments, the wind-powered generator may not include a housing. In yet other embodiments, the wind-powered generator assembly can be rotationally mounted to a support to allow the wind-powered generator assembly to be positioned such that its front end faces into the wind.

Figure 8:
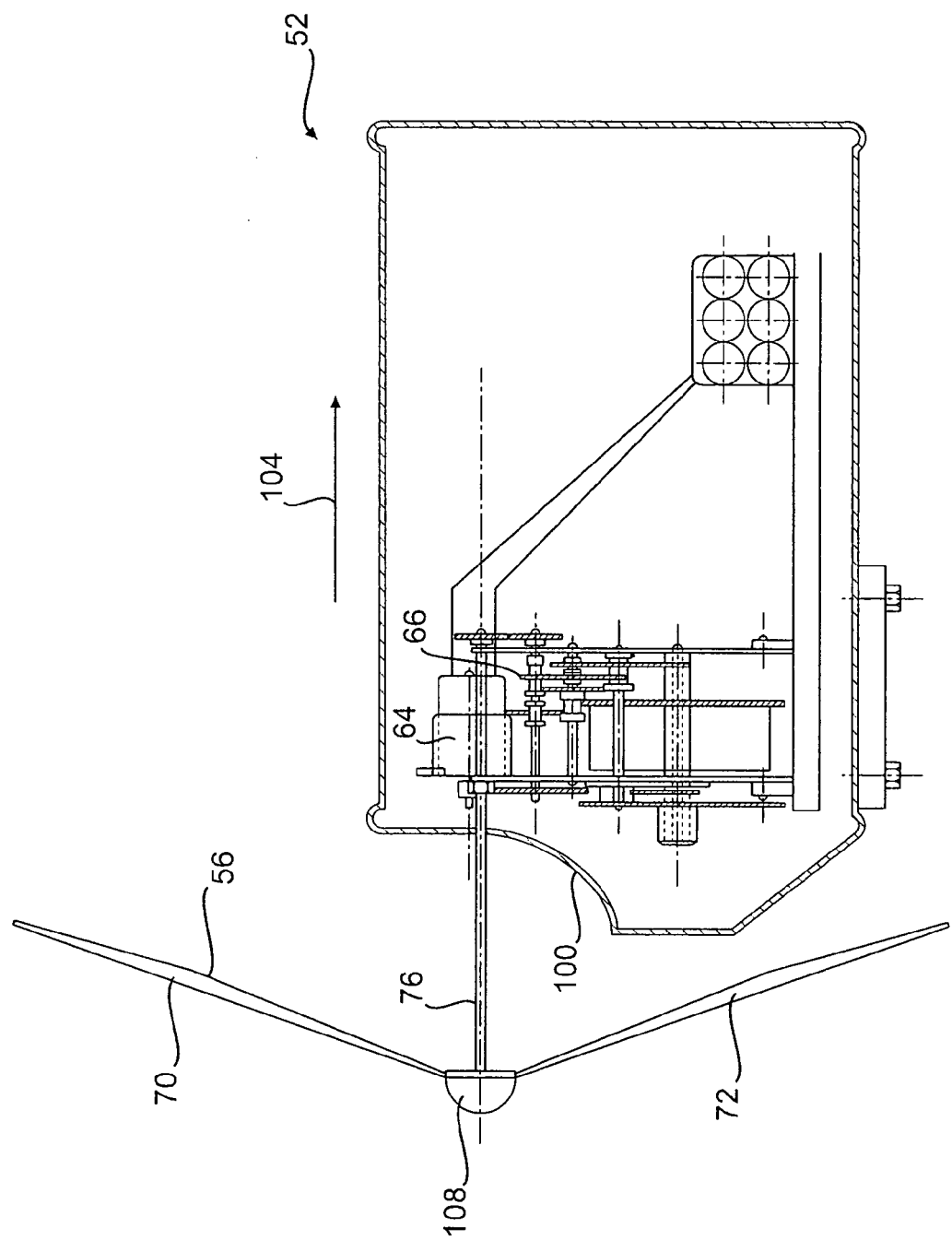
FIG. 8 is a cross sectional view taken along line 8-8 of FIG. 3.

Referring to FIG. 8, the wind actuator assembly 56 is operated by an operating wind traveling in the direction 104 toward the wind actuator assembly 56. The wind-powered generator assembly 52 can be arranged such that the front end 100 faces into the wind. The blades 70, 72, (74 not shown) of the wind actuator 56 are configured such that wind traveling in a direction 104 will force the blades 70, 72, 74, and thereby the rotor 108 and shaft 76, to rotate in the operating direction. In other embodiments, the wind actuator assembly can have a different number of blades or differently configured blades. In another embodiment, the wind actuator assembly can be a vertical axis wind actuator such as, for example, a Darrieus type wind actuator. The shaft 76 transmits the rotational force generated by the wind actuator assembly 56 to the electrical generator 64 through the gear train 66 to generate electricity. The aerodynamic design of the housing 54 facilitates the flow of an operating wind through the wind-powered generator assembly 52 to increase the wind power harnessed by the wind actuator assembly 56 and transmitted to the electrical generator 64.

The operable arrangement of the wind actuator assembly 56, the gear train 66, and the electrical generator 64 is shown in FIG. 7. The wind actuator assembly 56 includes three blades 70, 72, 74 connected to the rotor 108. The wind actuator assembly 56 further includes the shaft 76 that connects the rotor 108 to a wind actuator gear 110. The wind actuator gear 110 is operably connected to the gear train 66. The gear train 66 includes eight transfer gears 92, 116, 118, 120, 122, 124, 126, 128 and a spring housing gear 130. The transfer gears 92, 116, 118, 120, 122, 124, 126, 128 and the spring housing gear 130 transmit rotational force from the wind actuator gear 110 to the generator 64. Each transfer gear 92, 116, 118, 120, 122, 124, 126, 128 includes a shaft 96, 132, 134, 136, 138, 140, 142, 144 and a driven gear 146, 148, 150, 152, 154, 156, 158, 160 for receiving rotational force. Each transfer gear 92, 116, 118, 120, 122, 124, 126, 128, save the fifth transfer gear 92, includes a driving gear 162, 164, 166, 168, 170, 172, 174 for transferring rotational force. The driven gear or the driving gear on any of the transfer gears can be a spur gear or a rod combination unit.

The wind actuator gear 110 is operably engaged with the actuator section 88 of the gear train 66, which includes the first, second, third, fourth, and fifth transfer gears 92, 116, 118, 120, 122. The actuator section 88 of the gear train 66 transmits rotational force in the operating direction to the spring housing 68. The driven gear 154 of the fifth transfer gear 92 is operably engaged with the driving gear 168 of the fourth transfer gear 122 while the shaft 96 of the fifth transfer gear 92 passes through the first frame plate 180 to operably attach to the spring housing 68. A spring ratchet gear 182 is attached to the shaft 96 of the fifth transfer gear 92 on the actuator side of the first frame plate 180. The spring pawl mechanism 86 is mounted to the actuator side of the first plate 180 and operably engaged with the spring ratchet gear 182. The spring housing 68 is operably attached to the spring housing gear 132, which, together with the sixth, seventh, and eighth transfer gears 124, 126, 128, constitutes the generator section 90 of the gear train 66. The generator section 90 of the gear train 66 transmits rotational force in the operating direction to the electrical generator 64. The generator 64 includes a rotor 190 and a driven gear 192. The driven gear 192 of the rotor 190 receives the rotational force from gear train 66 and the electrical generator 64 uses the rotational energy to produce electricity.

The generator device 60 can include a transfer mechanism unit 45 that comprises the spring housing 68, the spring housing gear 130, the first frame plate 180, the shaft 96, the fifth transfer gear 92, the spring pawl mechanism 86, the spring ratchet gear 182, and a biasing member 214. The transfer mechanism unit 45 can receive the wind energy harnessed by the wind actuator assembly 56 via the actuator section 88 and transfer that energy to the electrical generator 64 via the generator section 90 of the gear train 66 to produce electricity.

Figure 9:
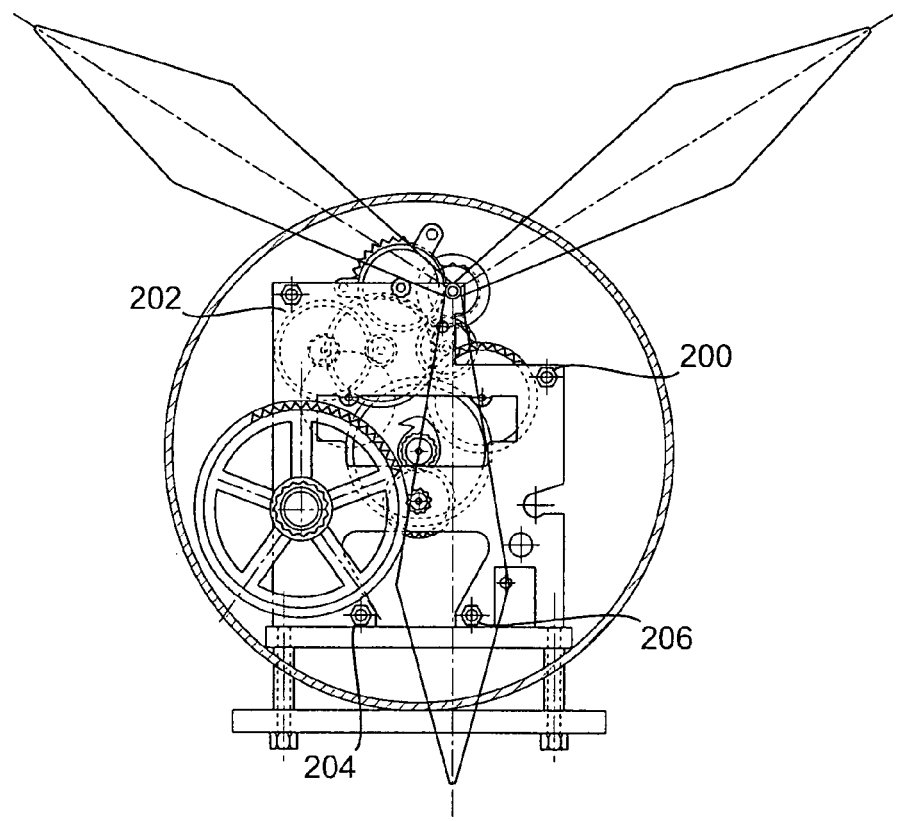
FIG. 9 is a cross sectional view taken along line 9-9 of FIG. 2.
Figure 10:
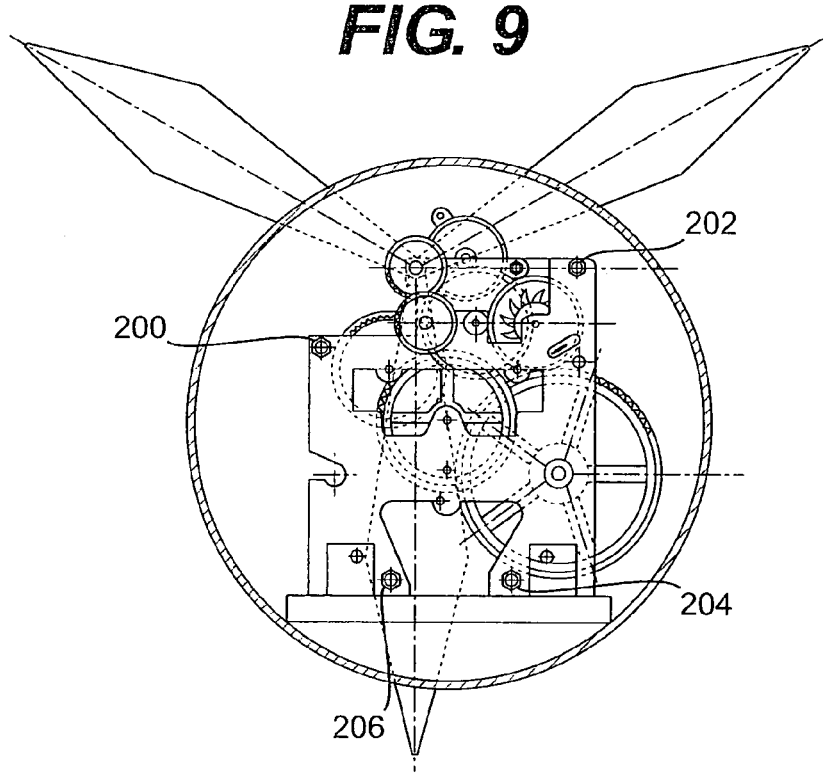
FIG. 10 is a cross sectional view taken along line 10-10 of FIG. 2

Referring to FIG. 4, the frame 78 comprises first and second plates 180, 194 disposed in spaced relationship to each other with the spring housing 68, the gear train 66, and the generator 64 supported by the plates 180, 194. The first plate 180, shown in FIG. 9, is similar to the second plate 194, shown in FIG. 10. Referring to FIGS. 9 and 10, four connecting rods 200, 202, 204, 206 are secured to the plates 180, 194. The connecting rods 200, 202, 204, 206 can secure the plates 180, 194 together. The connecting rods 200, 202, 204, 206 may pass through holes in the plates 180, 194 and can be secured on either end to the first and second plates 180, 194 by nuts. The spring housing 68 and the generator 64 are disposed generally between the plates 180, 194, as shown in FIG. 4.

Figure 11:
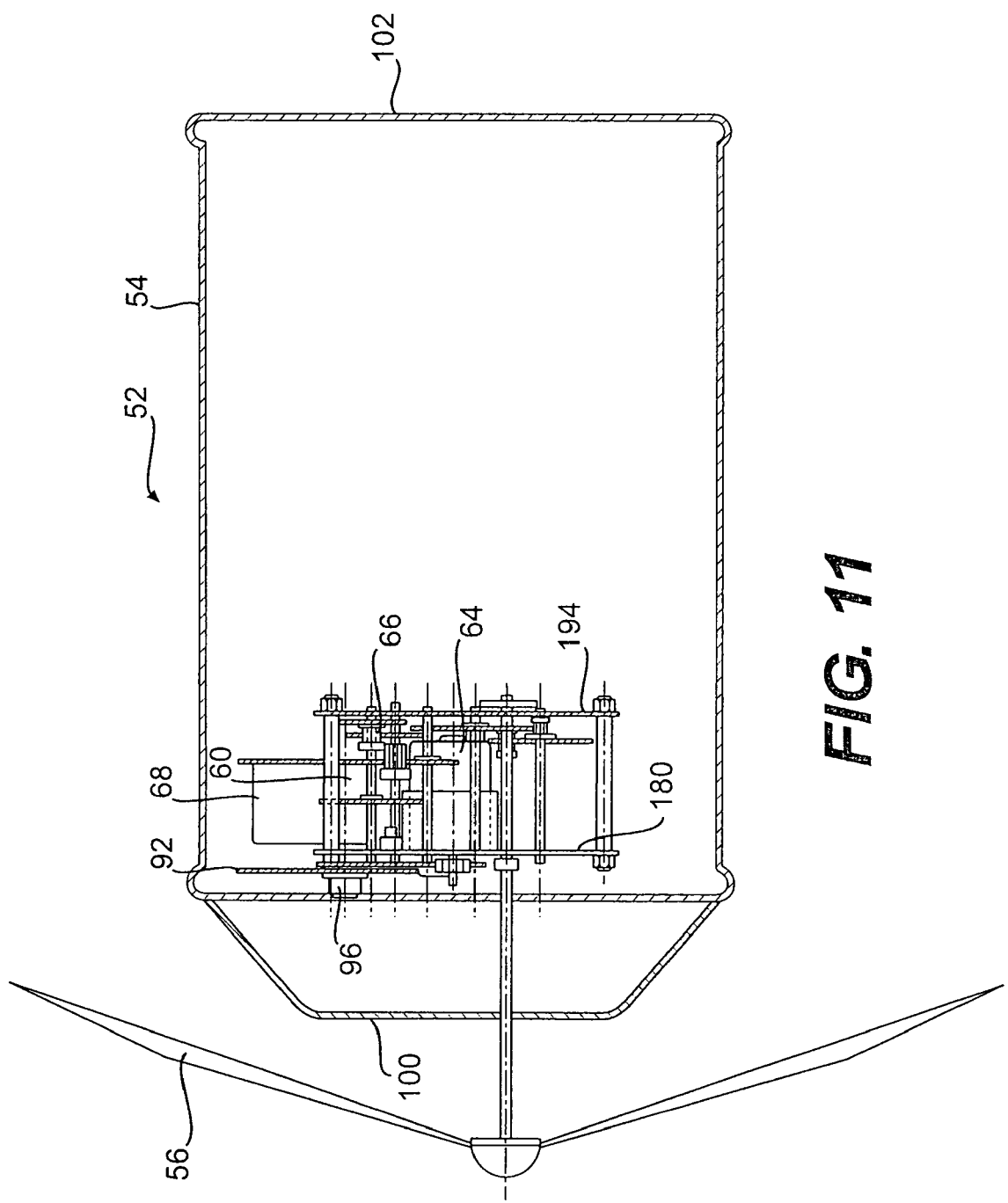
FIG. 11 is a cross sectional view taken along line 11-11 of FIG. 3.
Figure 15:
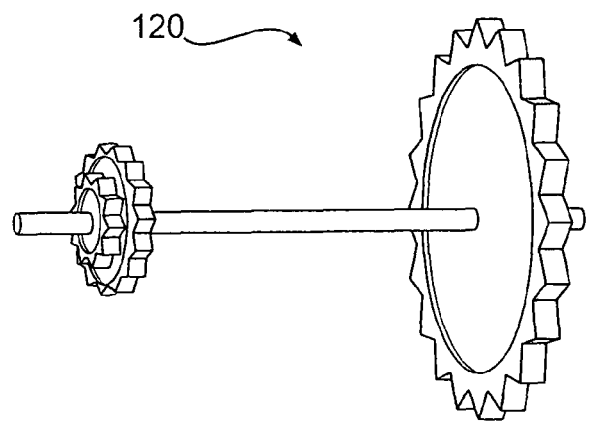
FIG. 15 is a perspective view of the third transfer gear of the wind-powered generator of FIG. 1.
Figure 16:
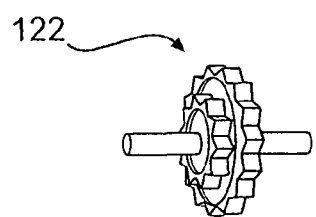
FIG. 16 is a perspective view of the fourth transfer gear of the wind-powered generator of FIG. 1.
Figure 17:
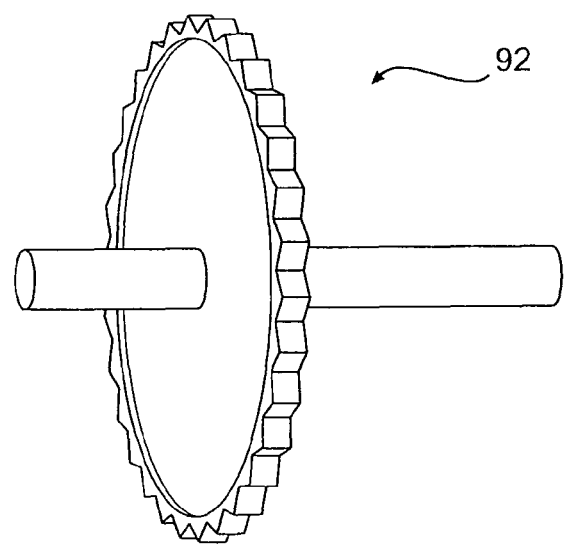
FIG. 17 is a perspective view of the fifth transfer gear of the wind-powered generator of FIG. 1.

Referring to FIG. 11, the shafts of the transfer gears are rotatably mounted to at least one of the plates 180, 194 such that the transfer gears are free to rotate with respect to the plates 180, 194 along an axis defined by each respective shaft. Referring to FIG. 7, the driven gear 146 of the first transfer gear 116 is operably arranged with the wind actuator gear 110 such that rotation of the wind actuator gear 110 rotates the first transfer gear 116. The driving gear 162 of the first transfer gear 116 is operably arranged with the driven gear 148 of the second transfer gear 118 such that rotation of the first transfer gear 116 also rotates the second transfer gear 118. The driving gear 164 of the second transfer gear 118 is operably arranged with the driven gear 150 of the third transfer gear 120 such that rotation of the second transfer gear 118 also rotates the third transfer gear 120. The driving gear 166 of the third transfer gear 120 is operably arranged with the driven gear 152 of the fourth transfer gear 122 such that rotation of the third transfer gear 120 also rotates the fourth transfer gear 122. The driving gear 168 of the fourth transfer gear 122 is operably arranged with the driven gear 154 of the fifth transfer gear 92 such that rotation of the fourth transfer gear 122 also rotates the fifth transfer gear 92. The shaft 96 of the fifth transfer gear 92 is operably arranged with the spring housing 68 such that rotation of the fifth transfer gear 92 also rotates the spring housing gear 132. The spring pawl mechanism 86 and spring ratchet gear 182 ensure that the fifth transfer gear 92 only rotates in the operating direction. The spring housing gear 130 is operably arranged with the driven gear 156 of the sixth transfer gear 124 such that rotation of the spring housing gear 130 also rotates the sixth transfer gear 124. The driving gear 170 of the sixth transfer gear 124 is operably arranged with the driven gear 158 of the seventh transfer gear 126 such that rotation of the sixth transfer gear 124 also rotates the seventh transfer gear 126. The driving gear 172 of the seventh transfer gear 128 is operably arranged with the driven gear 160 of the eighth transfer gear 128 such that rotation of the seventh transfer gear 126 also rotates the eighth transfer gear 128. The driving gear 174 of the eighth transfer gear 128 is operably arranged with the driven gear 192 of the generator 64 such that the generator creates electricity when the eighth transfer gear 128 is rotated.

Figure 18:
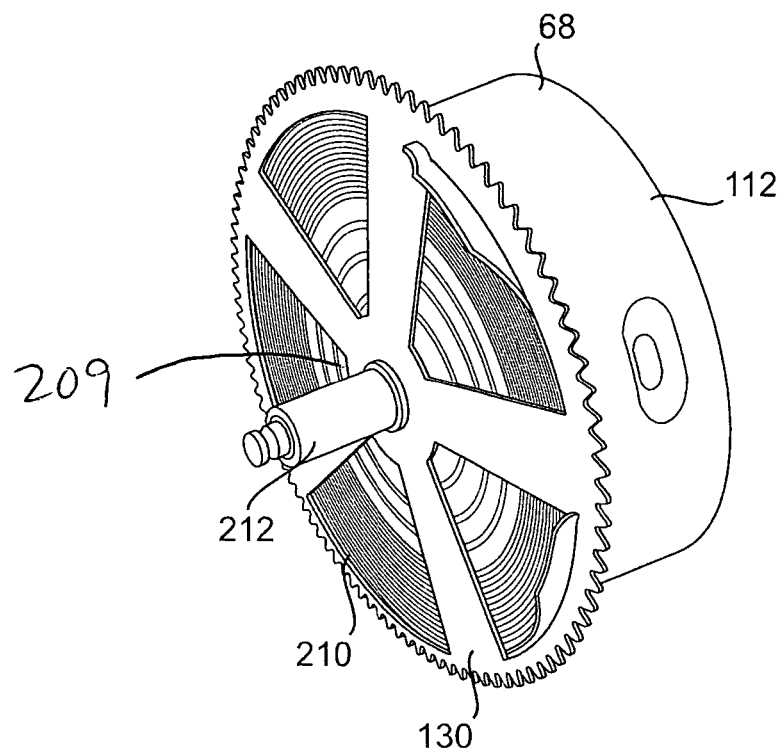
FIG. 18 is a front perspective view of the spring housing of the wind-powered generator of FIG. 1.
Figure 19:
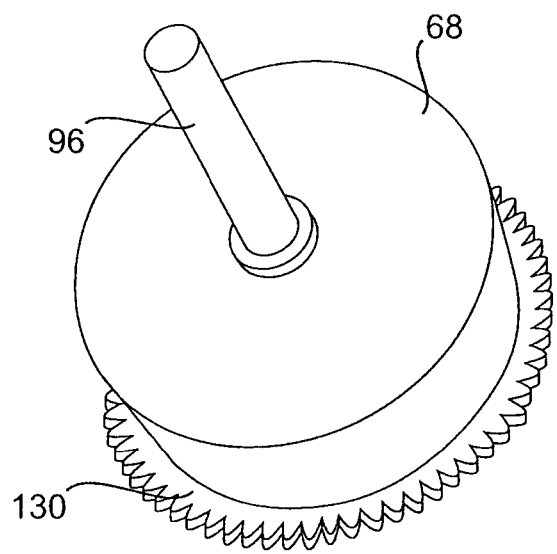
FIG. 19 is a rear perspective of the spring housing of FIG. 18.
Figure 20:
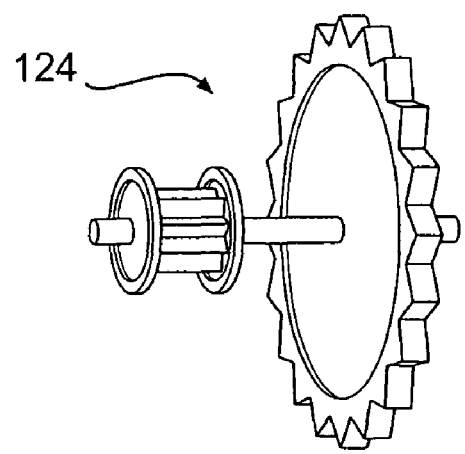
FIG. 20 is a perspective view of the sixth transfer gear of the wind-powered generator of FIG. 1.
Figure 21:
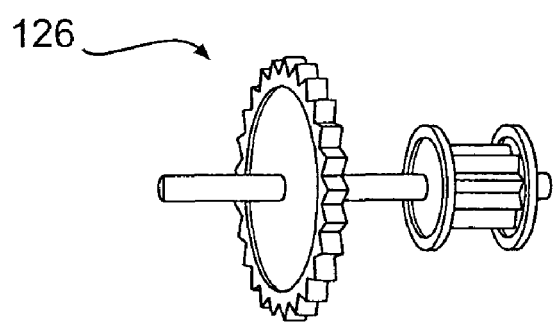
FIG. 21 is a perspective view of the seventh transfer gear of the wind-powered generator of FIG. 1.
Figure 22:
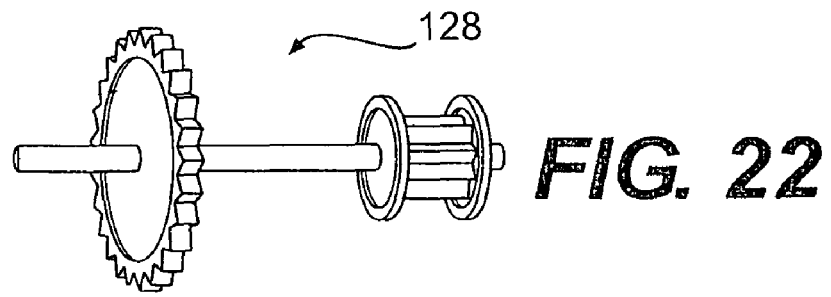
FIG. 22 is a perspective view of the eighth transfer gear of the wind-powered generator of FIG. 1.

Referring to FIG. 18, the spring housing 68 includes a reel 209, a tape spring 210 wound around the reel 210, the spring housing gear 130 secured to the reel 209, and an extension member 212 extending from the spring housing gear 130. The shaft 96 of the fifth transfer gear 92 is operably arranged with the spring housing 68, as shown in FIG. 18.

Referring to FIG. 11, the spring housing 68 is supported by the first plate 180 via the shaft 96 of the fifth transfer gear 96. The shaft 96 is rotatably supported within a mounting hole of the plate 180 such that the shaft 96 is free to rotate with respect to the plate 180. The spring housing 68 is supported by the second plate 194 via the extension member. The extension member is rotatably supported within a mounting hole of the plate 194 such that the spring housing gear 132 is free to rotate with respect to the plate 194.

Referring to FIG. 7, the spring pawl mechanism 86 includes a spring pawl that is engaged with a spring ratchet gear 182. The spring ratchet gear 182 is mounted to the shaft 96 of the fifth transfer gear 92. The spring pawl 86 is pivotally mounted to the actuator side of the first plate 180. A biasing member 214 is provided to urge the spring pawl 86 into operative engagement with the spring ratchet gear 182. The biasing member 214 is mounted to the actuator side of the first plate 180. A return stop member is mounted to the first plate and is arranged with the spring ratchet gear.

The rotation of the shaft 96 of the fifth transfer gear 92 in the operating direction winds the tape spring around the reel portion of the shaft 96. The winding of the tape spring creates a spring force, which is exerted against the reel portion of the shaft 96 in the return direction. As mentioned above, the spring pawl mechanism 86 resists this force on the shaft 96, resulting in the tape spring urging the spring housing 68 and the spring housing gear 132 to rotate in the forward, operating direction as the tape spring unwinds.

Figure 23:
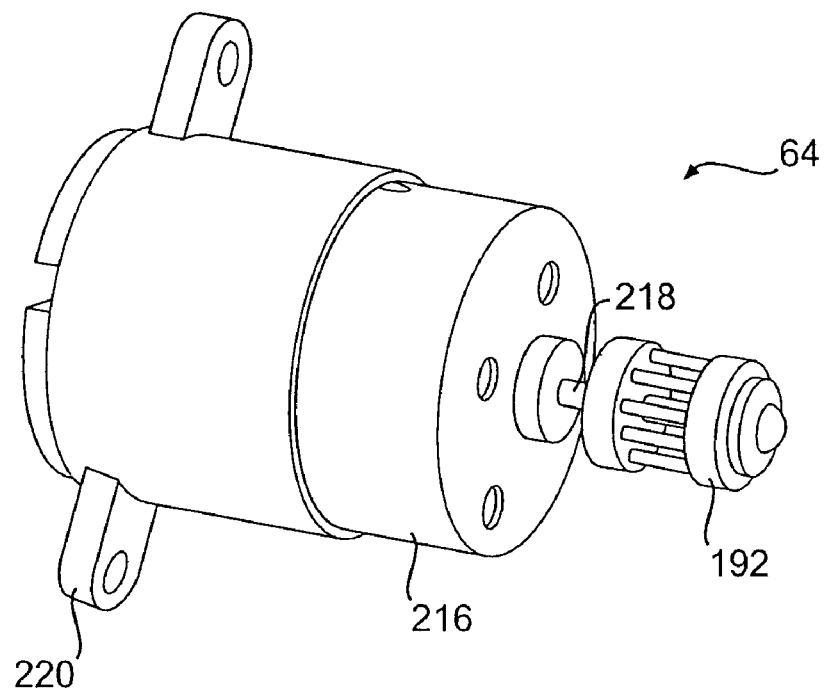
FIG. 23 is a perspective view of the generator of the wind-powered generator of FIG. 1, the generator having a rod-combination driven gear extending therefrom.
Figure 24:
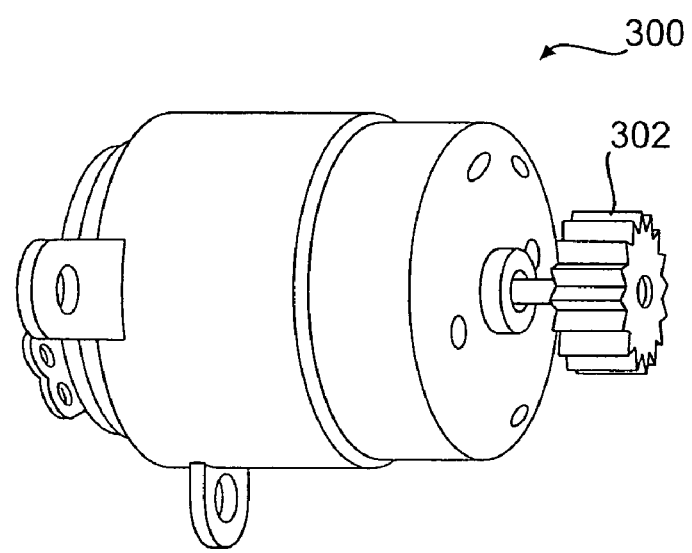
FIG. 24 is a perspective view of a second embodiment of a generator suitable for use with the wind-powered generator of the present invention, the generator having a spur gear extending therefrom.

As shown in FIG. 23, the generator 64 is relatively cylindrical in shape. The generator comprises a body 216, a shaft 218, a driven gear 192, and a bracket 220. The shaft 218 extends from the body 216 with the driven gear 192 disposed at a distal end thereof. Referring to FIG. 6, the driving gear 174 of the eighth transfer gear 128 is in operable position with the driven gear 192 of the generator 64 such that when the eighth transfer gear 128 rotates, the driven gear 182 will rotate the shaft 218 resulting in the generation of electrical energy by the generator 64. Referring to FIG. 23, the mounting bracket 220 can be used to mount the generator 64 to the second plate. As shown in this figure, the driven gear 192 is a rod-combination. In another embodiment of the generator 300, as shown in FIG. 24, the driven gear 302 can be a spur gear.

Figure 25:
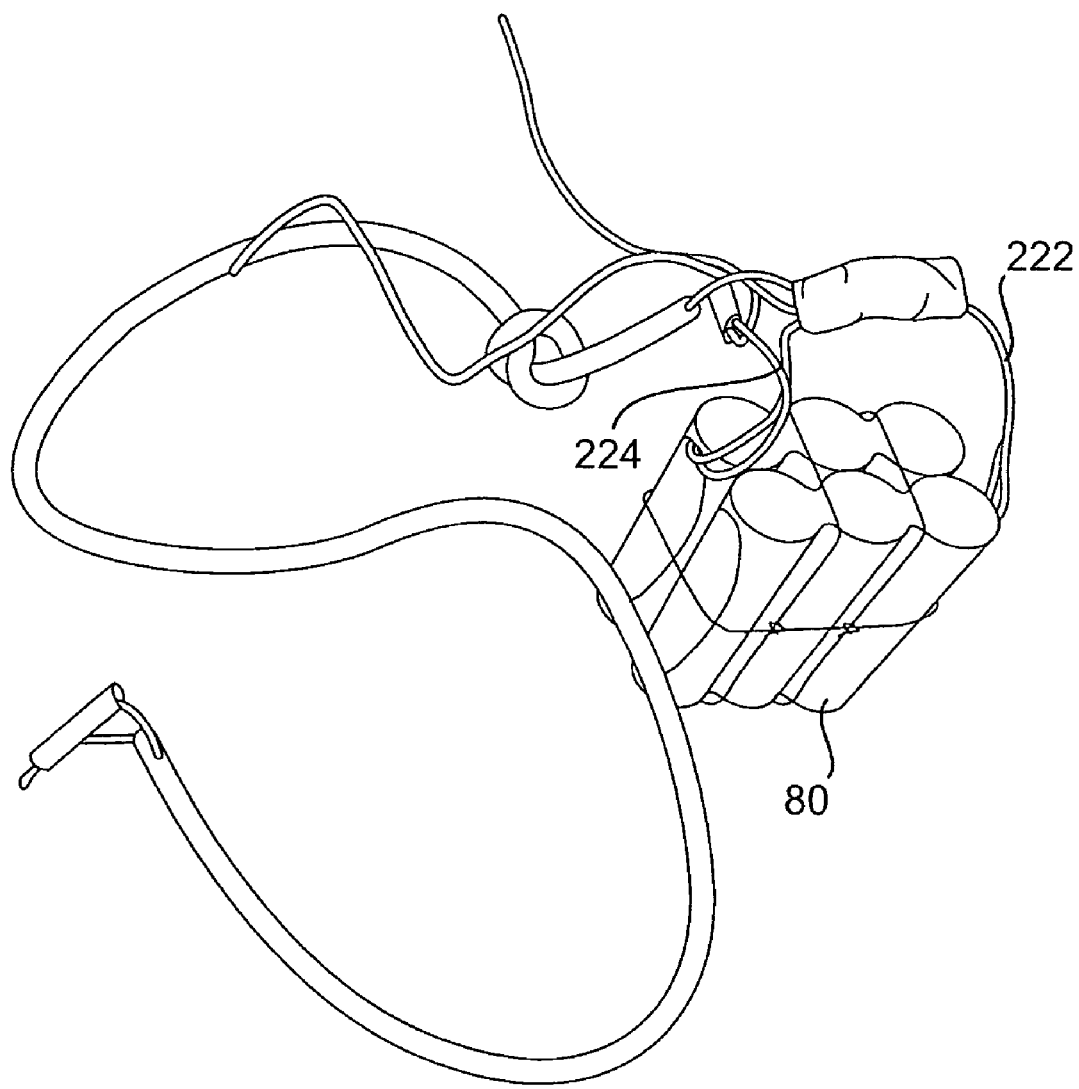
FIG. 25 is a perspective view of a rechargeable battery pack of the light assembly of FIG. 1.

Referring to FIG. 25, the rechargeable battery or battery pack 80 can be connected to the generator such that the electricity created by the generator can be stored and used at a later point in time rather than immediately during operation of the generator. A cable 222 can be used to connect the battery 80 to the generator.

Figure 26:
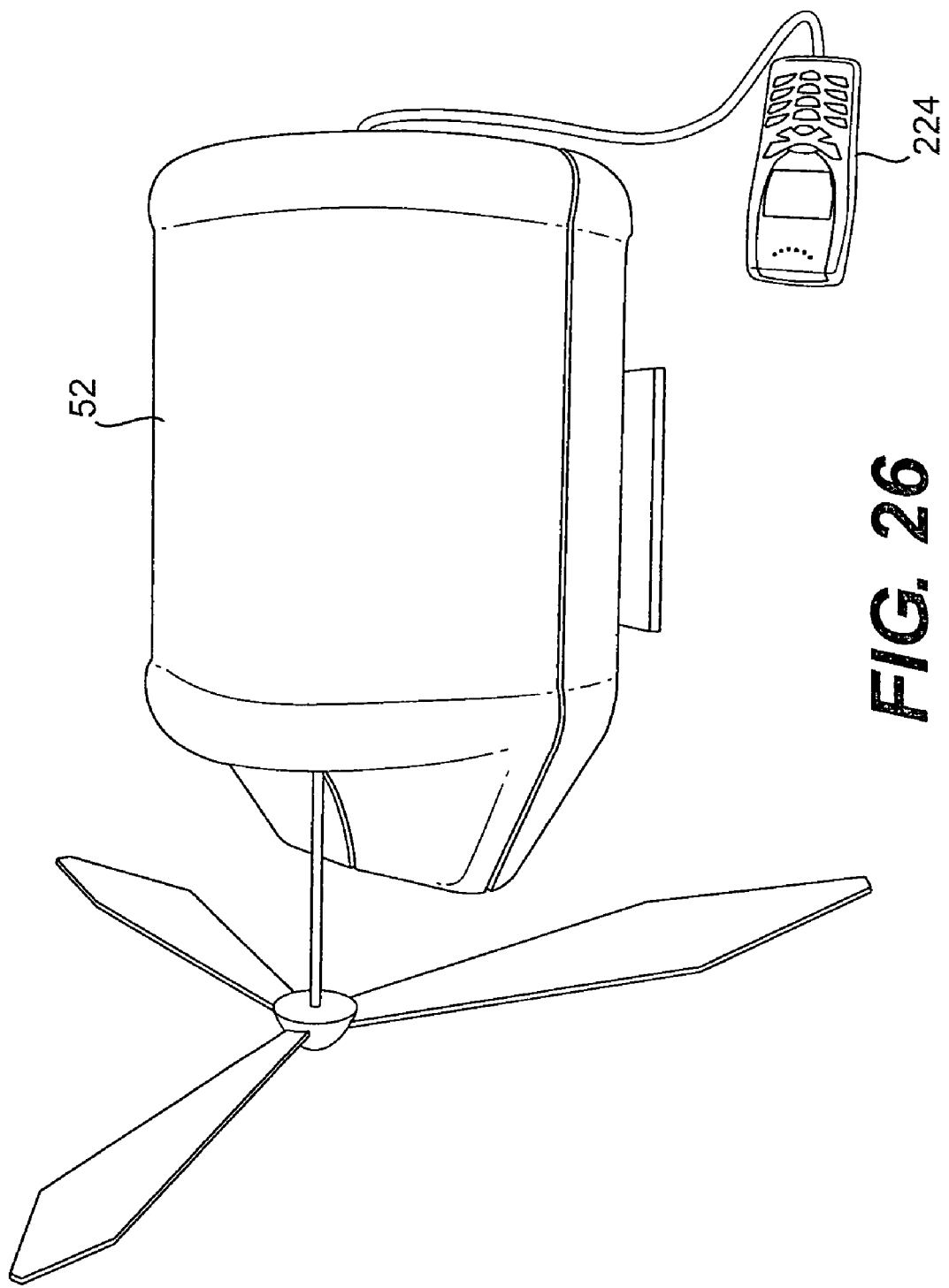
FIG. 26 is a perspective view of a wind-powered generator according to the present invention with a cellular phone electrically connected thereto.
Figure 27:
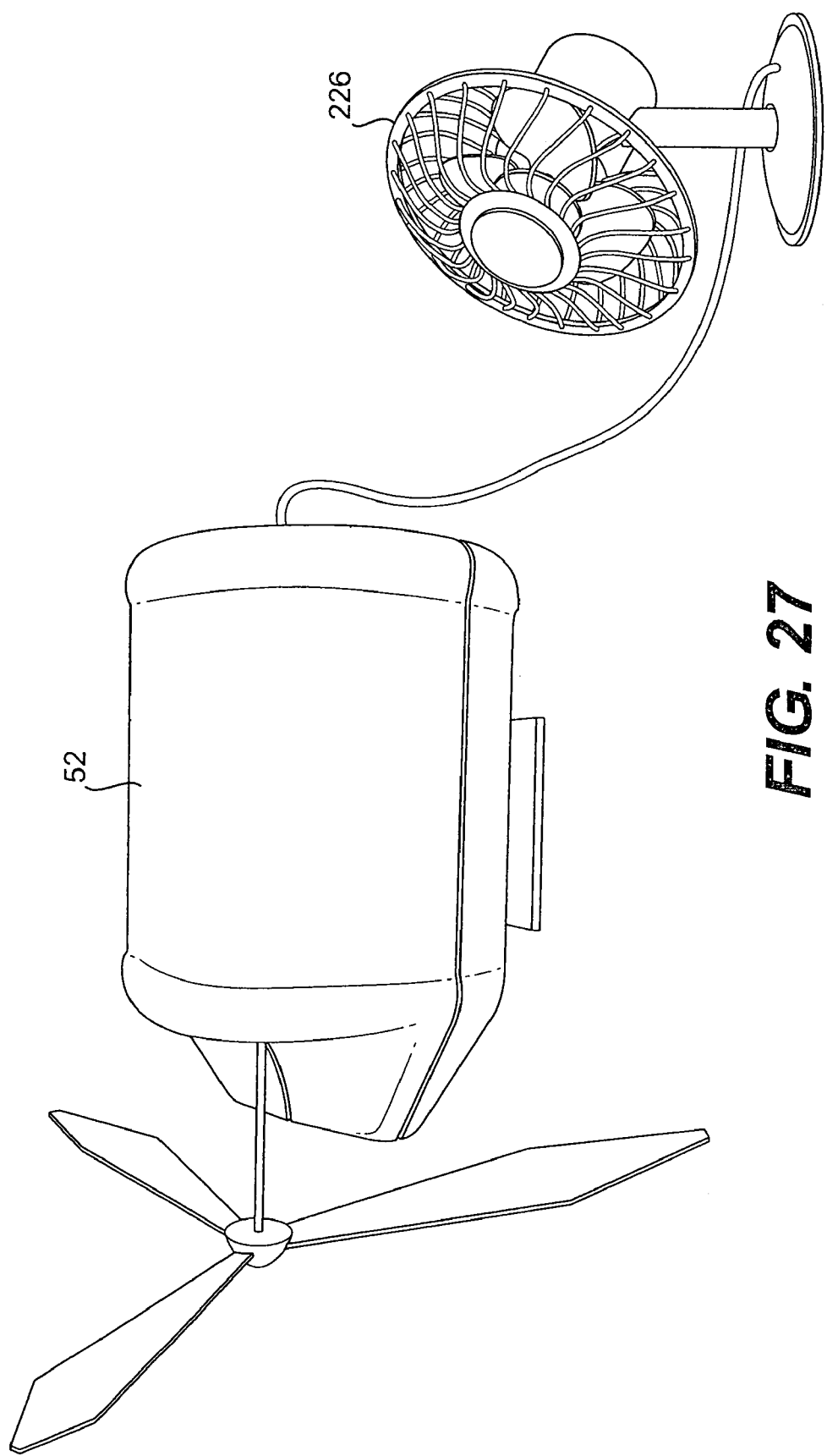
FIG. 27 is an enlarged perspective view of a wind-powered generator according to the present invention with an electric fan electrically connected thereto.
Figure 28:
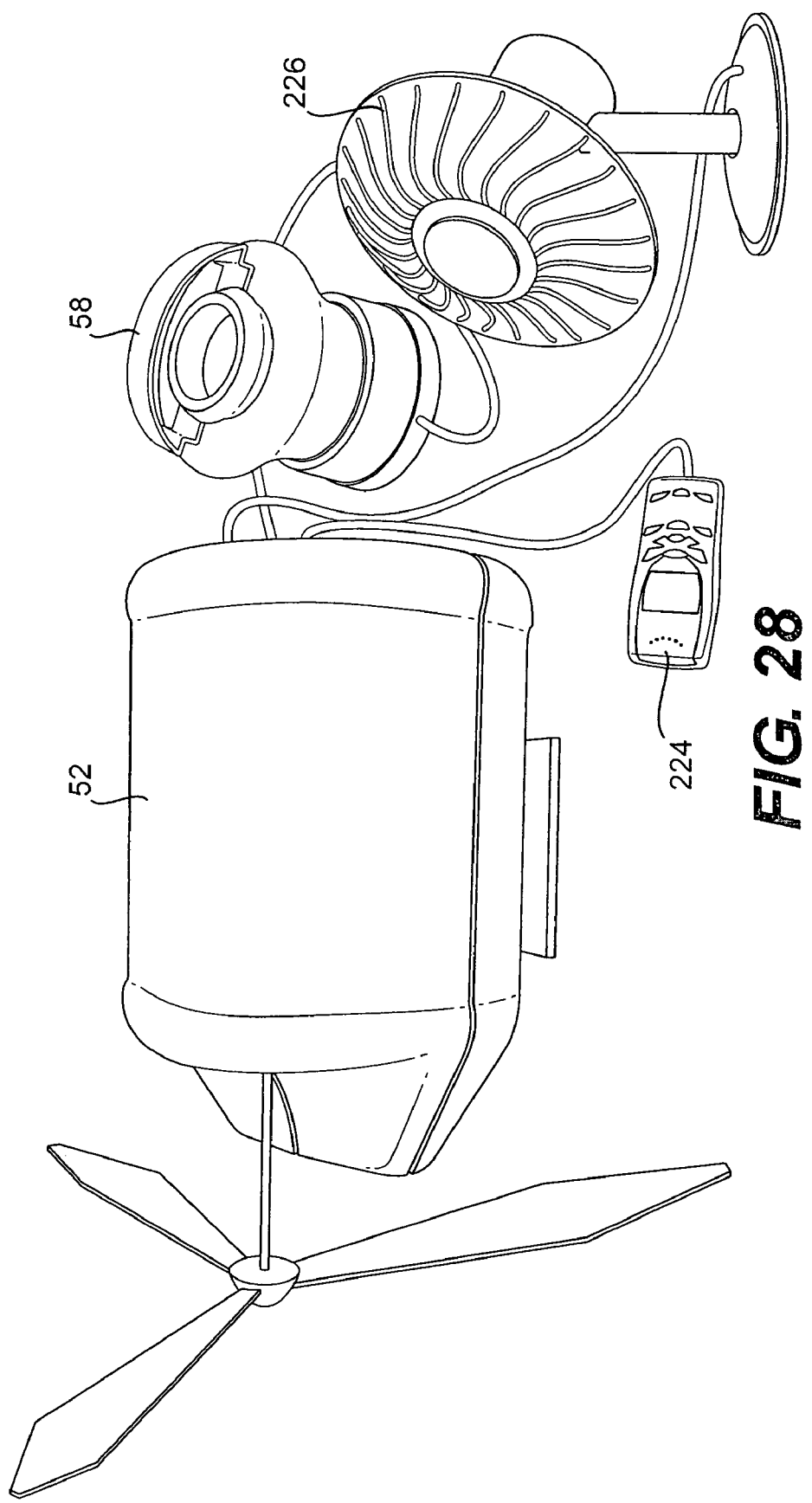
FIG. 28 is another enlarged perspective view of the light assembly of FIG. 1 having a fan and a cellular phone electrically connected thereto.

Many types of electrical devices can be powered by the invention. For example, the wind-powered generator assembly 52 can be used to power items such as the light source 58 (as shown in FIG. 1), a mobile phone 224 (as shown in FIG. 26), or a fan 226 (as shown in FIG. 27). Additionally, as shown in FIG. 28, the wind-powered generator device 52 can be connected to more than one device at a time, e.g. the assembly can include a light source 58 and other devices such as the fan 226 and the mobile phone 224. In yet other embodiments, the manual-powered generator can be used to power any suitable electrically-powered device.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A wind-powered electrical assembly comprising:
   a wind-powered actuator assembly adapted to rotate about an axis in an actuating direction when subject to an operating wind;
   a spring assembly, the spring assembly having a shaft, a reel mounted to the shaft, a tape spring wound around the reel, a spring pawl mechanism operably arranged with the shaft, and a spring gear, the tape spring mounted on the reel such that when the shaft is moved in an operating direction, the reel rotates in the operating direction and the tape spring develops a return force, the return force urging the reel to move in a return direction, the return direction opposing the operating direction, and the spring pawl mechanism operably engaged with the shaft of the first gear to resist movement of the shaft in the return direction to cause the spring gear to rotate in the operating direction;
   an actuator gear train, the actuator gear train operably arranged with the wind-powered actuator and the shaft of the spring assembly to transfer the rotation of the wind-powered actuator to the spring assembly;
   an electrical generator, the electrical generator having a rotor;
   a generator gear train operably arranged with the spring gear of the spring assembly and the rotor of the electrical generator such that the rotor of the electrical generator rotates when the tape spring unwinds; and
   a rechargeable battery, the rechargeable battery electrically connected to the electrical generator.

2. The electrical assembly of claim 1, further comprising:
   an electrical device, the electrical device electrically connected to at least one of the electrical generator and the battery.

3. The electrical assembly of claim 2, wherein the electrical device is a light source.

4. The electrical assembly of claim 2, wherein the electrical device is a fan.

5. The electrical assembly of claim 2, wherein the electrical device is a mobile telephone.

6. The electrical assembly of claim 1, wherein the drive train of the manual actuator assembly includes at least eight transfer gears.

7. The electrical assembly of claim 1, wherein the wind-powered actuator assembly includes a shaft, a rotor, and at least one blade attached to the rotor, the at least one blade configured to rotate around an axis defined by the shaft in an operating direction when exposed to an operating wind.

8. The electrical assembly of claim 1, further comprising:
   a housing, the gear train, the electrical generator, and the battery disposed within the housing, and at least a portion of the wind-powered actuator assembly projecting from the housing.

* * * * *